US012643070B2

(12) United States Patent
Abbasi

(10) Patent No.: US 12,643,070 B2
(45) Date of Patent: Jun. 2, 2026

(54) DIRECT AIR CARBON CAPTURE CATALYST SYSTEM

(71) Applicant: Cyrus Abbasi, Katy, TX (US)

(72) Inventor: Cyrus Abbasi, Katy, TX (US)

( * ) Notice: Subject to any disclaimer, the term of this patent is extended or adjusted under 35 U.S.C. 154(b) by 449 days.

(21) Appl. No.: 18/209,068

(22) Filed: Jun. 13, 2023

(65) Prior Publication Data

US 2023/0398490 A1      Dec. 14, 2023

Related U.S. Application Data

(60) Provisional application No. 63/352,138, filed on Jun. 14, 2022.

(51) Int. Cl.
| | |
|---|---|
| *B01D 53/86* | (2006.01) |
| *B01D 53/22* | (2006.01) |
| *B01D 53/26* | (2006.01) |
| *B01D 53/30* | (2006.01) |
| *C10G 2/00* | (2006.01) |

(52) U.S. Cl.
CPC ....... *B01D 53/8671* (2013.01); *B01D 53/226* (2013.01); *B01D 53/229* (2013.01); *B01D 53/266* (2013.01); *B01D 53/30* (2013.01); *C10G 2/50* (2013.01); *B01D 2255/20753* (2013.01); *B01D 2257/102* (2013.01); *B01D*

*2257/104* (2013.01); *B01D 2257/504* (2013.01); *B01D 2257/80* (2013.01)

(58) Field of Classification Search
CPC ...... C10G 2/50; B01D 53/75; B01D 2257/80; B01D 2257/104; B01D 2257/102; B01D 2255/20753; B01D 53/30; B01D 53/266; B01D 53/229
See application file for complete search history.

(56) References Cited

PUBLICATIONS

Kiani et al., Liquefied synthetic methane from ambient CO2 and renewable H2—A technoeconomic study, Journal of Natural Gas Science and Engineering, vol. 94, Oct. 2021, 104079.*

* cited by examiner

*Primary Examiner* — Jafar F Parsa
(74) *Attorney, Agent, or Firm* — Kirby Drake

(57) ABSTRACT

A direct air carbon capture catalyst system wherein using direct air capture, combined with electrolysis of water and molecular separation, leftover carbon dioxide may undergo a hydrogenation process in a catalyst reactor to produce a desired hydrocarbon as a product, while storing other components of air, such as nitrogen and oxygen separated in earlier steps as side products.

11 Claims, 4 Drawing Sheets

FIGURE 1C

DIRECT AIR CARBON CAPTURE CATALYST SYSTEM

CROSS-REFERENCE TO RELATED APPLICATION

The present Application is a non-provisional of, and claims priority to, U.S. Patent Application No. 63/352,138 filed Jun. 14, 2023, the disclosure of which is incorporated by reference in its entirety.

FIELD OF THE DISCLOSURE

The present disclosure relates to carbon capture to combat climate change, and more particularly, to clean power production and making clean sources of hydrocarbons needed in different industries.

BACKGROUND

Present carbon capture systems sometimes tend to store carbon underground. While carbon may be captured through these systems, it may require new infrastructure, which may be expensive.

SUMMARY

Embodiments of the present disclosure may provide a direct air carbon capture catalyst system wherein using direct air capture, combined with electrolysis of water and molecular separation, leftover carbon dioxide may undergo a hydrogenation process in a catalyst reactor to produce the desired hydrocarbon as a product, while storing other components of air, such as nitrogen and oxygen separated in earlier steps as side products. The system according to embodiments of the present disclosure may provide a green energy-powered hydrocarbon generator that may capture $CO_2$ from the atmosphere or other emission sources. It may provide a unique energy storage solution for the green energy sector by addressing transmission and storage challenges that have impeded the growth of solar and wind energy production. As carbon emissions continue to increase, it is clear that a combination of renewable energy sources (such as wind and solar) and the development of carbon capture, utilization, and storage (CCUS) technologies is necessary to reduce atmospheric $CO_2$ levels. Carbon utilization means that $CO_2$ is not only stored but also serves a purpose. This can include direct utilization. With a power consumption of approximately 2122 watts and an efficiency of approximately 75% in an embodiment of the present disclosure, the system may store energy from six solar panels in the form of a chemical potential battery.

Embodiments of the present disclosure may provide a direct carbon capture catalyst system comprising: an air compressor that may receive ambient air; one or more vapor filters that may filter out water vapor in the ambient air; at least one ball valve positioned after the one or more vapor filters to shut down gas flow to the system; a flow meter that may provide flow feedback measurements for gases moving from the compressor; a nitrogen membrane that may filter out nitrogen, wherein the nitrogen may pass through the at least one ball valve to a nitrogen storage tank; at least one oxygen membrane that may receive an air mixture excluding the separated nitrogen to filter out oxygen, wherein the oxygen may pass through the at least one ball valve to an oxygen storage tank; an electrolysis chamber that may receive water and produce hydrogen gas; and a reactor that may receive (1) a remaining air mixture including carbon dioxide and excluding the filtered oxygen and (2) hydrogen gas produced in the electrolysis chamber, wherein the carbon dioxide and hydrogen gas may react at temperatures of approximately 400 degrees Celsius in a catalyst core to produce hydrocarbons. The catalyst core may be Ni/Al2O3 or a combination of rhodium, iron, nickel, cobalt, molybdenum, iridium, palladium, platinum, or ruthenium for methanation of $CO_2$ and then P-doped graphitic carbon nitride or P-doped g-$C_3N_4$ (CNP) to achieve direct photocatalytic methane conversion into ethanol under ambient conditions using CNP. Hydrocarbons may be produced using a catalyst core, wherein the catalyst core is Ni/Al$_2$O$_3$ or a combination of rhodium, iron, nickel, cobalt, molybdenum, iridium, palladium, platinum, or ruthenium for methanation of $CO_2$ and then conversion of methane into methanol and ethanol over nickel oxide on a ceria-zirconia catalyst. Hydrocarbons may be produced using a catalyst core, wherein the catalyst core is Ni/Al$_2$O$_3$ or a combination of rhodium, iron, nickel, cobalt, molybdenum, iridium, palladium, platinum, or ruthenium for methanation of $CO_2$ and then $CO_2$ reduction to CO via a Ni—NS—C catalyst to produce CO using $H_2$ collected from electrolysis and methane generated to make syngas.

The hydrocarbons may be stored, compressed, and/or may be directly used through a regulator or go through a secondary step for further processing. The system may include one or more solar panels, solar heaters, or electric heaters that heat the reactor. The system also may include an atomizer injection unit. The system may further include one or more filters to prevent entry of unwanted materials to the nitrogen membrane and/or at least one oxygen membranes. The system also may include at least one needle valve. The system also may include safety leak detectors and auto shut off of safety valves and switches.

Other embodiments of the present disclosure may provide a method for direct carbon air capture using a catalyst system, the method comprising: receiving ambient air through an air compressor (or industrial fans or turbines); separating out nitrogen and oxygen from ambient air using one or more membranes resulting in leftover carbon dioxide; storing the separated nitrogen and oxygen; and using a hydrogenation process on leftover carbon dioxide in a catalyst reactor to produce hydrocarbon end products. The method also may include using one or more vapor filters, filtering out water vapor in the ambient air before separating out nitrogen and oxygen. The separated nitrogen may pass through a ball valve to a nitrogen storage tank for storage or for use in later steps for conversion. The separated oxygen may pass through a ball valve to an oxygen storage tank for storage or for use in later steps for conversion. The method also may include producing hydrogen gas for the hydrogenation process in an electrolysis chamber. The hydrogenation process may occur at temperatures of approximately 400 degrees Celsius in a catalyst core. The catalyst core may be Ni/Al2O3. The catalyst reactor may be heated using solar thermal power. The hydrocarbon end products may be methane gas, methanol, ethanol, or syngas.

BRIEF DESCRIPTION OF THE DRAWINGS

For a more complete understanding of this disclosure, reference is now made to the following description, taken in conjunction with the accompanying drawings, in which:

FIGS. 1A-1C depict a direct air carbon capture catalyst system according to an embodiment of the present disclosure.

DETAILED DESCRIPTION

Embodiments of the present disclosure may provide a direct air carbon capture catalyst system that may utilize different catalyst materials to produce hydrocarbons. The system may directly capture carbon dioxide from the air and purify it by passing the air through one or more membranes to separate and store air components. This also may get carbon dioxide ready for a chemical reaction to take place into the reactor that may be heated to a specified temperature based on the reactor core and type of hydrocarbon product. It should be appreciated that solar thermal heating may be used to heat the reactor without departing from the present disclosure. Catalyst materials may include, but are not limited to, metal composites and nanotech. Hydrocarbons produced may include, but are not limited to, methane and methanol. The system according to embodiments of the present disclosure may be scalable and modifiable. The resultant product may be scaled and may be transported easily, such as in a standard pickup truck. Further, the system according to embodiments of the present disclosure may use flood water to produce hydrogen needed for the reaction, as the system may be equipped with a water distiller.

Figure 1A:
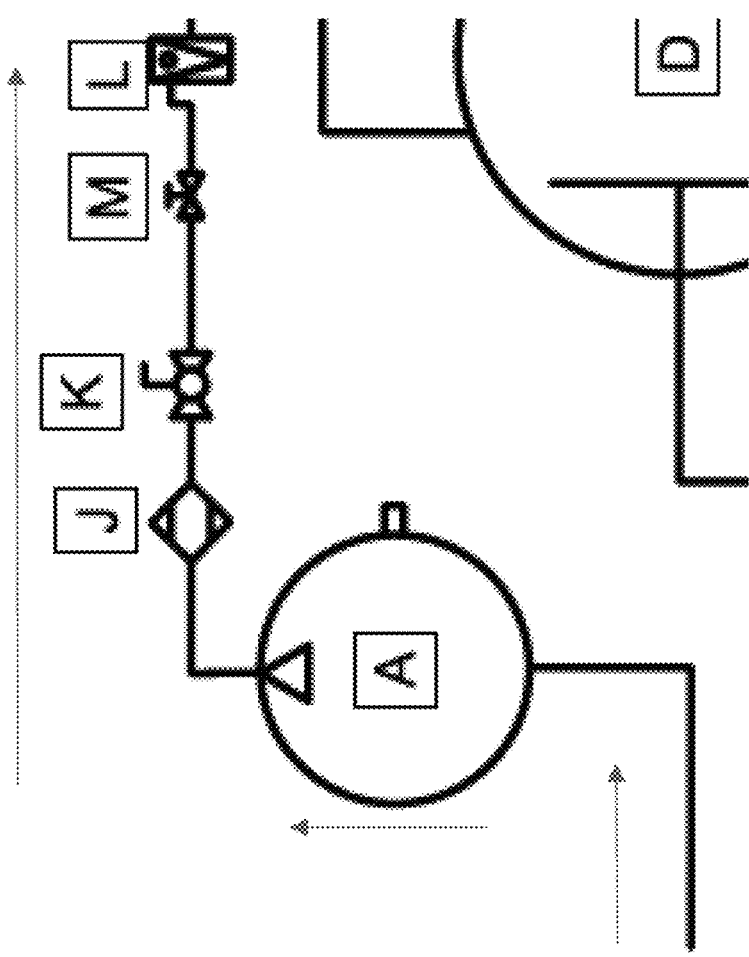
Figure 1B:
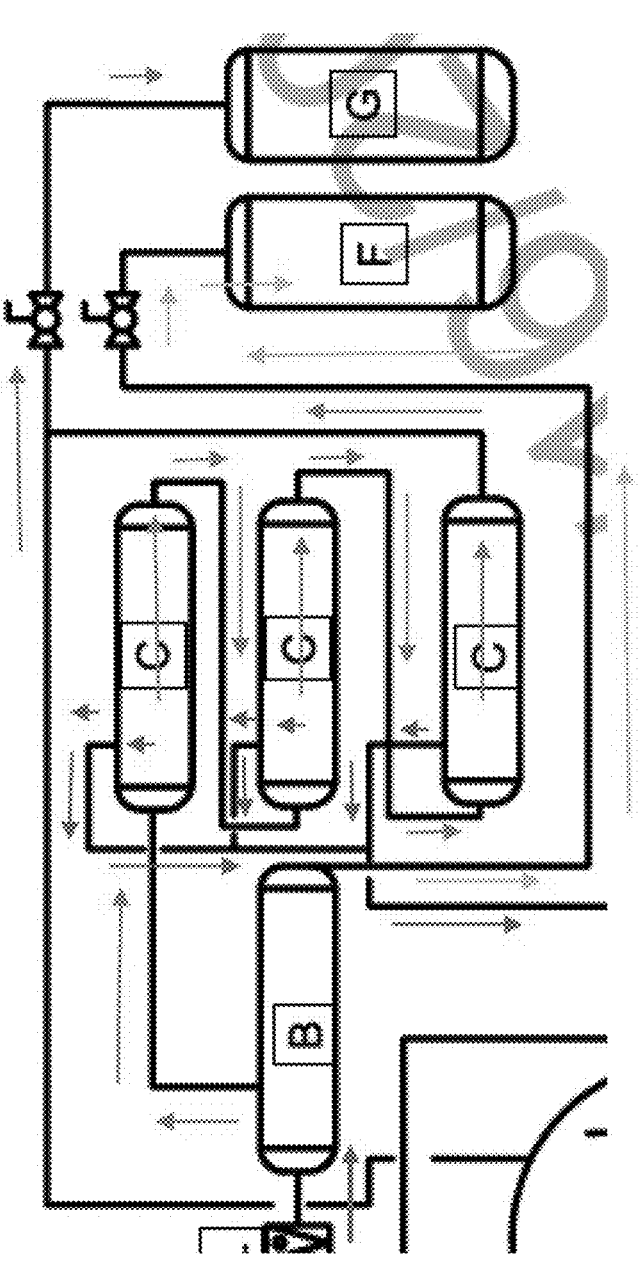
Figure 1C:
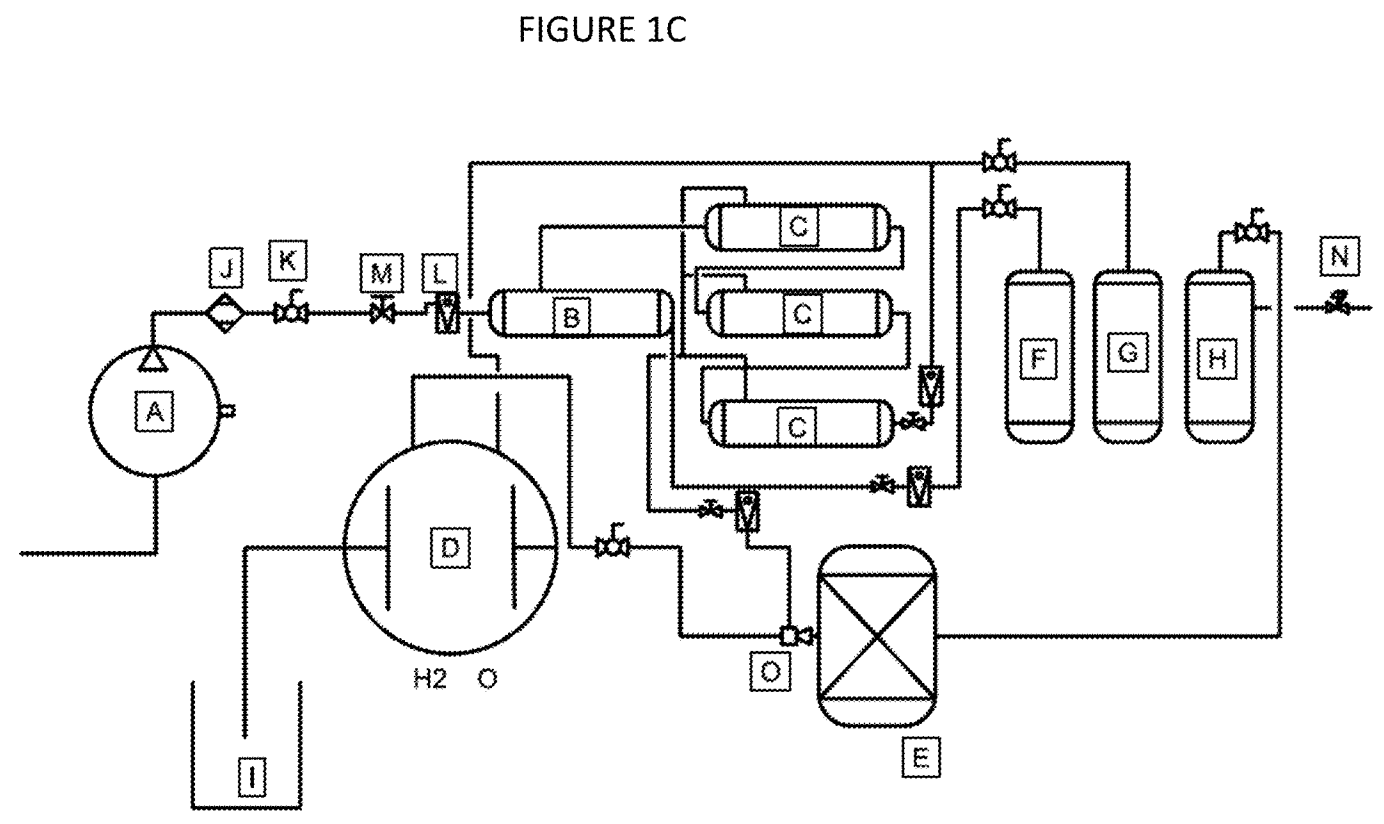

FIGS. 1A-1C depict a direct air carbon capture catalyst system according to an embodiment of the present disclosure. As depicted in FIG. 1A, ambient air may be pushed to the system using fans into an air chamber or by using an air compressor [A]. While fans or air compressors are described herein, it should be appreciated that other mechanisms for moving air may be used without departing from the present disclosure. Water vapor in the air may be filtered out via one or more vapor filters [J]. A valve, such as a ball valve [K], may be placed after the vapor filters to shut down gas flow to the system. A needle valve may control the flow of gas into the system [M]. While one needle valve is described herein, it should be appreciated that more than one needle valve may be used in embodiments of the present disclosure. A flow meter may provide flow feedback measurements for necessary adjustments [L].

As depicted in FIG. 1B, a nitrogen membrane may filter out nitrogen [B] and allow for remaining gases to move to the next step [arrows to [C]] while nitrogen that has been separated may move to a nitrogen storage tank passing a ball valve [arrows to [F]]. The air mixture excluding the separated nitrogen may then pass through an oxygen membrane [C] to filter out oxygen [arrows to [C]] for storage, like what has been described with respect to nitrogen, passing a ball valve to an oxygen storage tank [G] and the remaining air mixture moving to the reactor. While certain membranes are described herein, it should be appreciated that more, fewer, or different membranes may be used without departing from the present disclosure.

FIG. 1C depicts a direct carbon capture catalyst system according to another embodiment of the present disclosure. The system may include air compressor A, $N_2$ membrane B, a plurality of $O_2$ membranes C, electrolysis cell D, reactor E, $N_2$ tank F, $O_2$ tank G, $CH_4$ tank H, water reserves I, vapor filter J, a plurality of ball valves K, flow meter M, regulator N, needle valve L, and atomizer injection unit O. While a $CH_4$ tank is depicted herein, it should be appreciated that it may be a hydrocarbon, hydrocarbon fuel mixture tank, gas or liquid in embodiments of the present disclosure. Atomizer injection unit O may mix fluids to achieve high efficiency reaction by injecting the right ratio of mixture. Vapor filter J, ball valve K, and needle valve L may be connected in series between air compressor and $N_2$ membrane B. Each of the plurality of $O_2$ membranes C may be connected to $N_2$ membrane B.

As depicted in FIG. 1C, carbon dioxide/argon may move to reactor [E]. Water from the reservoir/water reserves [I] may enter the electrolysis chamber/cell [D], and oxygen produced may "T" into a separate oxygen gas line from [C] to the storage tanks [G]. Hydrogen produced in the electrolysis chamber [D] may "T" into the carbon dioxide/argon gas to enter the reactor chamber [E]. At temperatures around 400° C. in the catalyst core [Ni/$Al_2O_3$] CO/$CO_2$ may react with hydrogen gas to produce hydrocarbons [$CH_4$] [E]. While a certain catalyst core is described herein, other catalysts may be used without departing from the present disclosure. The resultant product may be stored [H], compressed, or can be used directly at the end going through the proper regulator [N].

Figure 2:
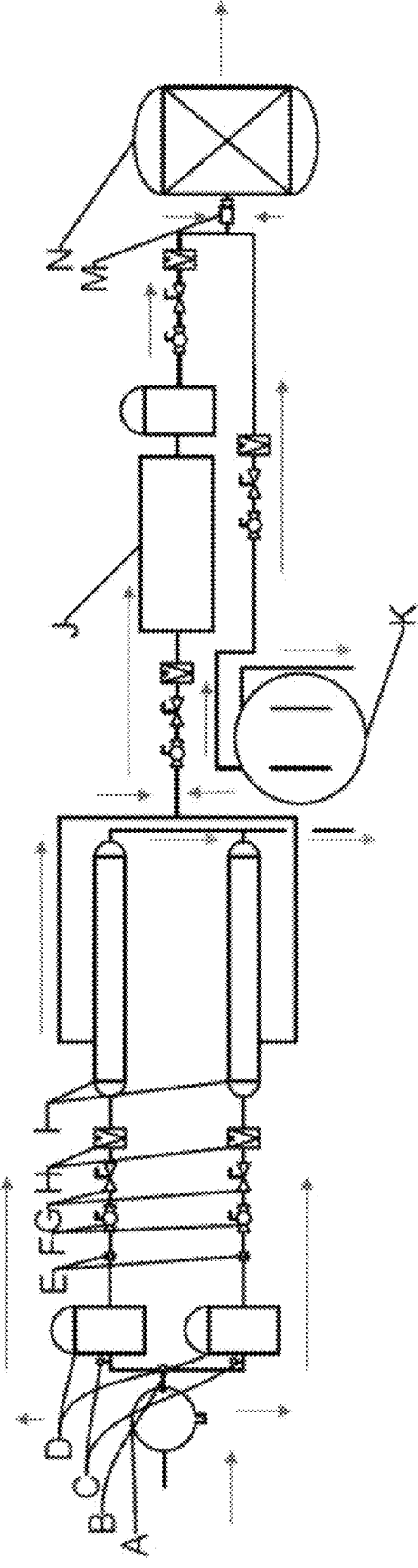
FIG. 2 depicts an overview diagram of a direct carbon capture catalyst system according to an embodiment of the present disclosure.

FIG. 2 depicts an overview diagram of a direct carbon capture catalyst system according to an embodiment of the present disclosure. The system may include compressor A, three-way valve B, at least one pressure gauge C, at least one air tank D, at least one filter E, a plurality of shut-off valves F, a plurality of needle valves G, a plurality of flow meters H, at least one membrane I, a plurality of porous polymers J, electrolysis cell K, injector M, catalyst reactor N, electrical controls and logic boards. In an embodiment of the present disclosure, two pressure gauges C, two air tanks D, two filters D, five shut-off valves F, five needle valves G, five flow meters H, two membranes I, and 45 porous polymers J may be used; however, more or fewer of each component may be employed without departing from the present disclosure. Compressor may be employed at a power of approximately 1491 watts, pressure of approximately 175 psi, and flow of approximately 13 CFH; however, these values may be more or less without departing from the present disclosure. Three-way valve B may be employed at a power of approximately 31 watts; however, more or less power may be employed without departing from the present disclosure. Electrolysis cell K may be employed at a power of approximately 150 watts, pressure of approximately 58 psi, and flow of approximately 1.2 CFH; however, these values may be more or less without departing from the present disclosure. Catalyst reactor N and controls may be operated at a power of approximately 50 watts. Catalyst reactor N may be employed at flow of approximately 0.12 CFH and temperature of approximately 400 degrees Celsius; however, these values may be more or less without departing from the present disclosure.

One or more solar panels may be used to capture sunlight and convert it into electricity to power the system in some embodiments of the present disclosure. In an embodiment of the present disclosure, six solar panels may be used; however, more or fewer may be used without departing from the present disclosure. The solar panels may be employed at a power of approximately 350 watts in an embodiment of the present disclosure. While solar panels are described herein, it should be appreciated that other forms of energy including, but not limited to, wind turbines, power directly from the grid, or power from a plant power generator, may be used without departing from the present disclosure. The generated electricity may then be used to generate methane gas through a series of processes involving the various components. The end result may be a clean and renewable hydrocarbon source that can be used for various applications.

Air or emissions are captured and pressurized by the compressor to the specifications needed to separate $N_2$ and Argon gas from air through the membranes. The three-way valve and pressure gauges may work together to ensure that pressure needed to achieve the separation for each membrane is adequate. Flow meters may measure the flow rate of gases moving from the compressor to the membranes and needle valves installed before the membranes will allow for adjustment of the flow to achieve optimal separation. The shutoff valves may be placed as a precautionary safety mechanism to shutoff gas flow to the system in each step. Filters may be placed strategically to prevent the entry of unwanted components to the system's membranes.

Once the gas mixture moves through the separating process in the membranes, the $N_2$ and Argon separated may be collected, and the $O_2$ and $CO_2$ mixture may move to the second separating stage. In this stage, porous polymers may be used to separate the $O_2$ and $CO_2$. Oxygen then may be collected, and the remaining $CO_2$ may enter a reservoir tank. This tank may allow the system's flow adjustment at the reactors entrance in order to achieve the optimal mixture ratio at the injector. Simultaneously, the electrolysis cells may generate the needed $H_2$. The flow of $H_2$ gas may be adjusted and measured preparing gases to enter the injector where $H_2$ and $CO_2$ may be mixed and injected into the reactor. The catalyst's reactor chamber may heat to approximately 400 degrees Celsius to activate the catalyst's material and achieve maximum selectivity of $CO_2$. In this stage, hydrogenation conversion of $CO_2$ may produce methane gas. It should be appreciated that values identified herein are representative and should not be considered limiting with respect to the system and its applications. The components discussed herein are representative, and more or fewer components may be employed as applications require.

It should be appreciated that the conversion may be 1606 watts stored at 80% selectivity stored, and efficiency may be 75.6% at 80% selectivity in an embodiment of the present disclosure.

In some embodiments of the present disclosure, the carbon capture system may use chromatography techniques of separating gas molecules in a gas mixture for purposes of measurement and purification of feed gas or final product. These techniques may include, but are not limited to, the use of process gas chromatography and/or the use of fused silica capillary columns, PLOT columns, Metal MTX capillary columns as well as packed and micro-packed columns, with properties ranging from either combination or stand-alone properties such as boiling point columns, polar, electronegative, molecular sieves, carbon blacks that are used with coding or with no coding of the solid base and puros polymers. These techniques may utilize vapor filtration columns, pressure gauges, flow meters, valves including diaphragm piston valves, and rotary valves that are spring-loaded or piston-less diaphragm valves, slide valves, and/or ball valves. There may be embodiments of the present disclosure that may use explosion-proof boxes or air-purged electronics as well as HMI for onsite control, and or inclusion of touch, or light sensitive sensors for input, Modbus, and serial and ethernet communication capabilities. Flame ionization detectors, thermal conductivity detectors, and flame photometric detectors may be used in the system in embodiments of the present disclosure. There also may be embodiments of the present disclosure that may use one or more of the following temperature probes and heating elements, automatic pressure regulators, manual pressure regulators, needle valves. hydrogen shut-off systems, solenoid valves, and/or compressed air and pressure sensors. It also should be appreciated that some separations may need cryogenic techniques.

The system according to embodiments of the present disclosure may utilize chemical reactions and clean power to produce valuable commodities. The system may capture carbon, lowering the need for drilling for natural gas. The system according to embodiments of the present disclosure may utilize the already built infrastructure of gas pipelines to ease the transition to clean power on the general population and the society.

In production plants and manufacturing sites and cities, the system according to embodiments of the present disclosure may capture carbon before it has a chance to move to higher altitudes where it can be more effective greenhouse gas than in lower altitudes. The system also may be installed on reservoirs to use flood water and reduce stress exerted on the reservoir's dam. It should be appreciated that the system according to embodiments of the present disclosure as well as the gases produced, such as oxygen and nitrogen, and hydrocarbons can be used in a variety of industries such as hospitals, chemical plants, plastic or ethylene plants and/or consumer items.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A direct carbon capture catalyst system comprising:
   an air compressor that receives ambient air;
   one or more vapor filters that filter out water vapor in the ambient air;
   at least one ball valve positioned after the one or more vapor filters to shut down gas flow to the system;
   a flow meter that provides flow feedback measurements for gases moving from the compressor;
   a nitrogen membrane that filters out nitrogen, wherein the nitrogen passes through the at least one ball valve to a nitrogen storage tank;
   at least one oxygen membrane that receives an air mixture excluding the separated nitrogen to filter out oxygen, wherein the oxygen passes through the at least one ball valve to an oxygen storage tank;
   an electrolysis chamber that receives water and produces hydrogen gas; and
   a reactor that receives (1) a remaining air mixture including carbon dioxide and excluding the filtered oxygen and (2) hydrogen gas produced in the electrolysis chamber, wherein the carbon dioxide and hydrogen gas react at temperatures of approximately 400 degrees Celsius to produce hydrocarbons.

2. The system of claim 1, wherein hydrocarbons are produced using a catalyst core, wherein the catalyst core is $Ni/Al_2O_3$ or a combination of rhodium, iron, nickel, cobalt, molybdenum, iridium, palladium, platinum, or ruthenium for methanation of $CO_2$ and then P-doped graphitic carbon nitride or P-doped $g-C_3N_4$ (CNP) to achieve direct photocatalytic methane conversion into ethanol under ambient conditions using CNP.

3. The system of claim 1, wherein hydrocarbons are produced using a catalyst core, wherein the catalyst core is $Ni/Al_2O_3$ or a combination of rhodium, iron, nickel, cobalt, molybdenum, iridium, palladium, platinum, or ruthenium for methanation of $CO_2$ and then conversion of methane into methanol and ethanol over nickel oxide on a ceria-zirconia catalyst.

4. The system of claim 1, wherein hydrocarbons are produced using a catalyst core, wherein the catalyst core is $Ni/Al_2O_3$ or a combination of rhodium, iron, nickel, cobalt, molybdenum, iridium, palladium, platinum, or ruthenium for methanation of $CO_2$ and then $CO_2$ reduction to CO via a Ni—NS—C catalyst to produce CO using $H_2$ collected from electrolysis and methane generated to make syngas.

5. The system of claim 1, wherein the hydrocarbons are stored.

6. The system of claim 1, wherein the hydrocarbons are compressed.

7. The system of claim 1 further comprising:
a regulator that allows for direct use of the hydrocarbons.

8. The system of claim 1 further comprising:
one or more solar panels that heat the reactor.

9. The system of claim 1 further comprising:
an atomizer injection unit.

10. The system of claim 1 further comprising:
one or more filters to prevent entry of unwanted materials to the nitrogen membrane and/or at least one oxygen membranes.

11. The system of claim 1 further comprising:
at least one needle valve.

* * * * *